Figure 1:
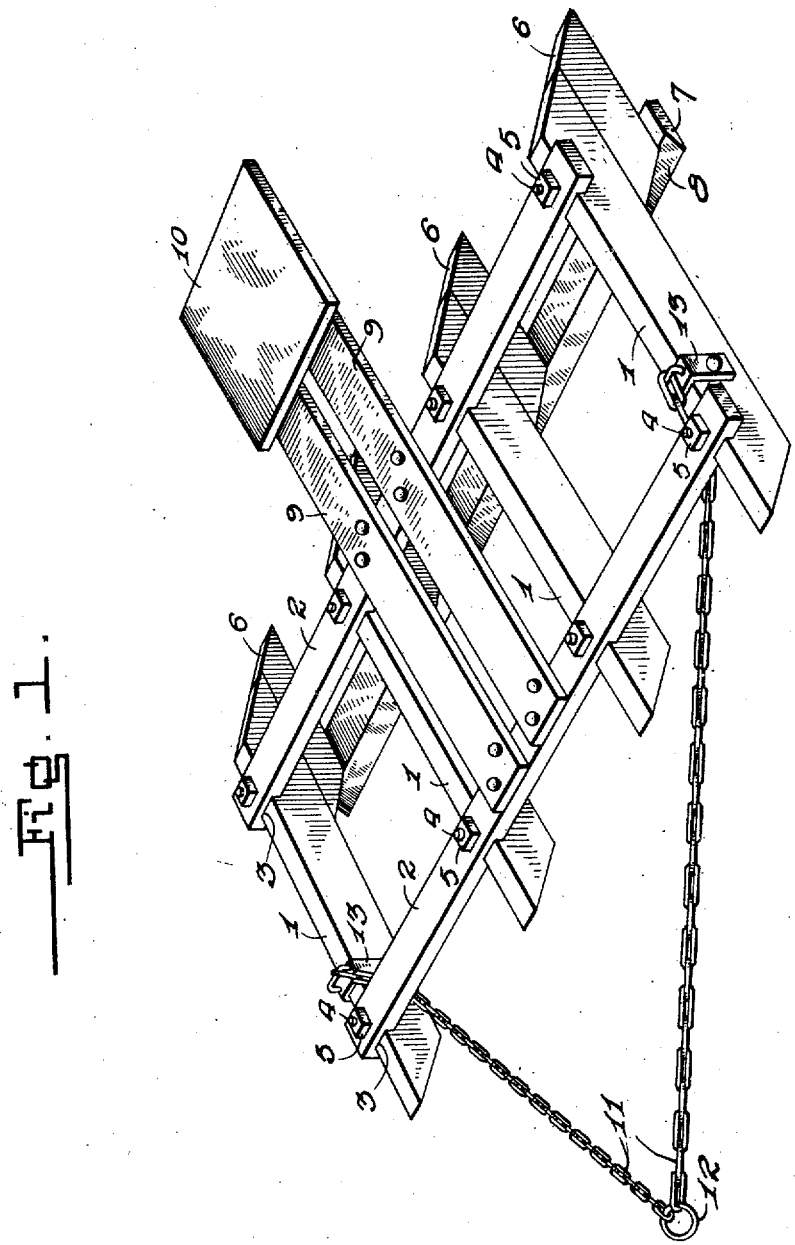

R. E. McNAMARA.
CULTIVATOR.
APPLICATION FILED JULY 18, 1910.

986,481.

Patented Mar. 14, 1911.
2 SHEETS—SHEET 1.

Inventor
Robert E. McNamara,

Witnesses
C. Everett Lancaster.
E. W. Cady

By E. E. Trooman,
Attorney.

R. E. McNAMARA.
CULTIVATOR.
APPLICATION FILED JULY 18, 1910.
986,481.
Patented Mar. 14, 1911.
2 SHEETS—SHEET 2.
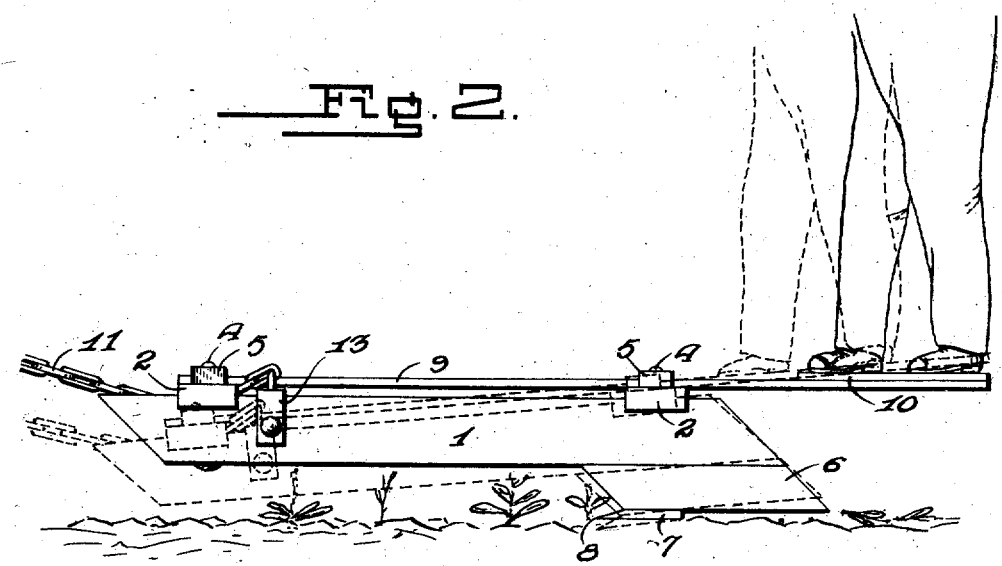
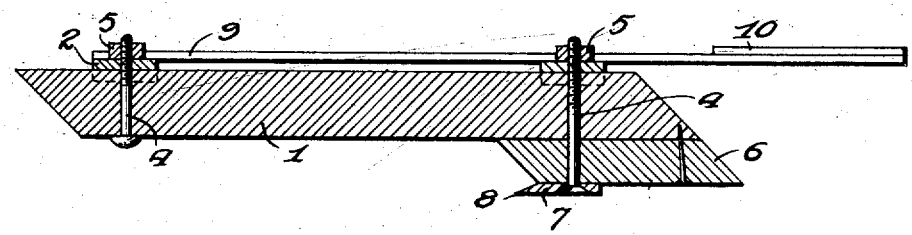
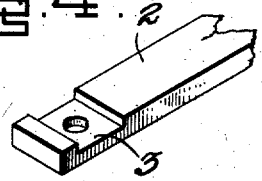
Robert E. McNamara, Inventor

UNITED STATES PATENT OFFICE.

ROBERT E. McNAMARA, OF WALLA WALLA, WASHINGTON.

CULTIVATOR.

986,481. Specification of Letters Patent. Patented Mar. 14, 1911.

Application filed July 18, 1910. Serial No. 572,620.

*To all whom it may concern:*

Be it known that I, ROBERT E. MCNAMARA, citizen of the United States, residing at Walla Walla, in the county of Walla Walla and State of Washington, have invented certain new and useful Improvements in Cultivators, of which the following is a specification, reference being had therein to the accompanying drawing.

This invention relates to cultivators and has special reference to that class of cultivators which are dragged over the surface of the ground, and are adapted to cut down roots, weeds and other growth.

The invention has for its object to provide an improved cultivator of this kind, which will be effective in operation, and by means of which a large quantity of weeds and other growth may be cut down.

Referring to the accompanying drawings: Figure 1 is a view in perspective of an improved cultivator constructed in accordance with this invention. Fig. 2 is a side view thereof showing it in operation. Fig. 3 is a longitudinal section thereof. Fig. 4 is a detail view in perspective of a portion of the frame work of the device.

A cultivator constructed in accordance with this invention consists of a number of longitudinal runners 1 of suitable length, spaced apart from each other, and as here shown preferably connected by means of front and rear strips 2, each consisting of a narrow wooden board or plank secured in any suitable manner to the runners 1, and as here shown, seated in sockets 3 in the top of the runners 1 and secured thereto in any suitable manner, as by means of bolts 4 and nuts 5.

Secured beneath the rear end of the runners 1 are heel runners 6, each consisting of a short timber secured to the runners 1 in any suitable manner, and as here shown preferably by means of bolts 4 and nuts 5, which secure the cross strips 2 to the runners 1. The heel runners 6 are preferably made of harder wood than the top runners, so as to stand the wear of rubbing on the ground.

Secured transversely to the underside of the heel runners 6 is a knife 7 which may be formed of common iron and is about one-half an inch in thickness by four inches in width, and is provided with a beveled cutting edge 8. The knife 7 is secured to the heel runners 6 by means of bolts 4 and nuts 5.

Mounted on the top of the cultivator is a platform which, as here shown, preferably consists of a pair of boards 9 extending across the timbers 2 and bolted thereto, said boards 9 extending back of the cultivator several feet according to the leverage desired. On the rear of the boards 9, and forming a part of the platform, is a square board 10 secured to the boards 9 in any suitable manner on which the driver of the cultivator stands, as shown in Fig. 2.

The cultivator is drawn by means of chains 11 having a ring 12 at their forward end to which a team is attached, and connected at their rear end to a clevis 13 bolted to each of the outside runners 1.

This cultivator works on the leverage principle; that is, it can be run any depth— from just skimming the top of the soil to a number of inches below the top. This is accomplished by standing on the board 10, at the end of the platform which tilts up the forward part of the cultivator and causes the rear portion of the cultivator— that is to say the heel runners—to skim over the top of the soil—the knife 7 being tilted up so as not to cut into the soil. The depth to which the knife cuts into the soil may be adjusted by the person on the platform altering his position, so that as he advances toward the front of the platform the cultivator tilts downward, which causes the knife to be tilted downward, and to be drawn downward into the soil. By means of this movement of the cultivator the knife 7 can also be automatically cleaned. As for example, when the roots, weeds and other growth cut off by the knife gather around the top of the same, by the operator stepping off the platform, causes the forward part of the cultivator to drop and the rear part to be tilted upward. When it is desired to sharpen the knife or replace it with a new one, it is easily removed by removing the nuts 5 and the bolts 4.

Having described the invention, I claim:—

1. A cultivator of the character described, consisting of a transverse frame having a number of longitudinal runners spaced apart from each other, heel runners mounted beneath the rear end of said runners, and means mounted beneath said frame for cutting weeds.

2. In a cultivator of the character described, a transverse frame, longitudinal top runners mounted on said frame and spaced apart from each other at intervals, a heel runner mounted on the under side of the end of each of said top runners, and a knife extending transversely beneath and secured to said heel runners.

3. In a cultivator of the character described, a transverse frame, longitudinal runners mounted at intervals apart on said frame, heel runners mounted beneath the rear end of said runners, means for cutting weeds mounted beneath said runners, and a platform mounted on the top of said frame and projecting rearwardly therefrom.

4. In a cultivator of the character described, a number of longitudinal runners spaced at intervals apart from each other, transverse bars mounted on the top of said runners and secured thereto, heel runners each secured beneath the rear end of the longitudinal runners, a cutting means extending transversely beneath said heel runners and secured thereto, and a platform 5. In a cultivator of the character described, a number of longitudinal top runners, each formed with a recess adjacent to its end, transverse bars each seated in said sockets, heel runners mounted beneath the rear end of each of said top runners, a transverse knife mounted beneath said heel runners, said several parts being secured together by bolts and nuts, and a platform mounted on the top of said transverse bars and projecting rearwardly therefrom.

6. In a cultivator of the character described, a number of longitudinal top runners at intervals spaced apart from each other, transverse bars secured to the top of said runners, a heel runner secured to the under side and at the end of each of said top runners, a transverse knife secured to the under side of said heel runners, a pair of boards secured to the top of said transverse bars and projecting in the rear of the runners, a platform on the rear end of said boards, and clevises on each of the outside top runners and draft chains connected with said clevises.

In testimony whereof I hereunto affix my signature in presence of two witnesses.

ROBERT E. McNAMARA.

Witnesses:
J. G. THOMAS,
E. W. OLSON.

---

Copies of this patent may be obtained for five cents each, by addressing the "Commissioner of Patents, Washington, D. C."